UNITED STATES PATENT OFFICE

1,973,012

SUBSTITUTION PRODUCTS OF THE CARBAZOLE SULPHONIC ACIDS

Friedrich Muth and Albert Schmelzer, Elberfeld, Germany, assignors to General Aniline Works, Inc., New York, N. Y., a corporation of Delaware No Drawing. Application January 7, 1930, Serial No. 419,197. In Germany January 23, 1929

7 Claims. (Cl. 260—46)

The present invention relates to new substitution products of the carbazole sulphonic acids and to a process for preparing same.

In accordance with the present invention a great number of new substitution products of carbazole sulphonic acids are obtainable by diazotizing the amino group of an amino-carbazole sulphonic acid or a derivative thereof and by replacing the diazo group in the known manner by an anion, for instance, —OH, —Cl, —Br, —I, —CN, —SCN, —SH, —S—S—, —NH—NH₂, —AsO₃H₂, —(SbO₂.nH₂O).

The new products probably correspond to the following general formula:

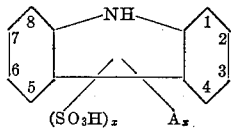

wherein A stands for an anion other than —SO₃H and $x$ stands for one of the numbers 1, 2 and 3, the positions 1 and 8 being not both substituted by OH-groups simultaneously with the substitution of both the 3 and 6 positions by —SO₃H-groups.

The new acids form in the free state colorless or weakly colored crystals which dissolve readily in water. They are valuable intermediate products for the preparation of dyestuffs and pharmaceutical products.

Our invention is illustrated by the following examples, without being limited thereto; the parts being by weight:

*Example 1.—1-hydroxy-carbazole - 3.6.8 - trisulphonic-acid*

100 parts of 1-amino-carbazole-3.6.8-trisulphonic acid (acid sodium salt) are dissolved in 200 parts of hot water and diazotized after adding 180 parts of 25% sulphuric acid at a temperature of about 35-40° C. The diazo compound thus formed is separated as a yellow paste of crystals; the separation is completed by salting out with sodium chloride. The separated diazo compound is dissolved in 5000 parts of hot water; this solution is dropped while stirring within two hours into a strongly boiling solution of 50 parts of crystallized copper sulphate in 2000 parts of water. To this solution 250 parts of diluted sulphuric acid are added. A vivid development of nitrogen takes place. The finish of the reaction is determined by taking out a sample and testing whether it still couples to form a dyestuff on the addition of an azo component. After the reaction is complete, the solution is made alkaline by means of sodium carbonate and filtered off with suction from the precipitated copper carbonate. By concentrating the solution the hydroxy-carbazole-3.6.8-trisulphonic acid separates in long, weakly brown-colored needles. In an analogous manner the following compounds are obtained: 1-hydroxy-carbazole-2.6.8-trisulphonic acid, 1-hydroxy - carbazole - 4.6.8 - trisulphonic acid, 1-hydroxy - carbazole-3.6-disulphonic acid, 1 - hydroxy-carbazole-3-sulphonic acid, and 1-hydroxy-carbazole-6-sulphonic acid.

*Example 2.—2 - hydroxy - carbazole - 3.6.8-trisulphonic-acid*

100 parts of 2-amino-carbazole-3.6.8-trisulphonic acid are dissolved in about 2000 parts of water and 100 parts of diluted sulphuric acid and diazotized at room temperature by dropping in a 10% solution of sodium nitrite. By salting out, the diazo compound is separated in yellow needles, often grouped in starlets. The separated diazo compound is dissolved in about 1500 parts of water and dropped into a boiling diluted sulphuric acid containing 250 parts of 25% sulphuric acid in 500 parts of water with the addition of a small quantity of copper powder. The decomposition is performed very quickly with the development of nitrogen. The solution freed from copper is concentrated and the 2-hydroxy-carbazole-trisulphonic acid is then salted out. In this way it is obtained in the form of short, spindle-shaped needles. In an analogous manner the following compounds are obtained: 2-hydroxy-carbazole-1.6.8-trisulphonic acid, 2-hydroxy-carbazole-1.4.8-trisulphonic acid, 2-hydroxy-carbazole-3.6-disulphonic acid, and 2-hydroxy-carbazole-6-sulphonic acid.

*Example 3.—3 - hydroxy - carbazole - 1.6.8-trisulphonic acid*

100 parts of 3-amino-carbazole-1.6.8-trisulphonic acid (acid potassium salt), prepared, for example, by nitrating and reducing the carbazole tetrasulphonic acid obtainable according to German Patent 224,952, are diazotized and brought in reaction as mentioned in Example 1. The 3-hydroxy-carbazole-1.6.8-trisulphonic acid separates in the form of weakly brown-colored needles. In an analogous manner the following compounds are obtained: 3-hydroxy-carbazole-1.5.8-trisulphonic acid, 3-hydroxy-carbazole-1.5.7-trisulphonic acid, 3-hydroxy-carbazole-2.6.8-trisulphonic acid, 3-hydroxy-carbazole-2.5.7-trisulphonic acid, 3-hydroxy-carbazole-6.8-disulphonic acid, 3-hydroxy-carbazole-5.7-disulphonic acid, 3-hydroxy-carbazole-6-sulphonic acid, and 3-hydroxy-carbazole-8-sulphonic acid.

*Example 4.—1.8-dihydroxy-carbazole-3.6-disulphonic acid*

100 parts of 1-amino-8-hydroxy-carbazole-3.6-disulphonic acid are diazotized and boiled as mentioned in Example 1. The 1.8-dihydroxy-carbazole-3.6-disulphonic acid obtained thereby is identical with the acid described in German Patent 224,952.

In an analogous manner the following compounds are obtained: 2.7-dihydroxy-carbazole-3.6-disulphonic acid, 3.6-dihydroxy-carbazole-1.8-disulphonic acid, 2.7-dihydroxy-carbazole-8-sulphonic acid, and 3.6-dihydroxy-carbazole-1-sulphonic acid.

*Example 5.—1-hydroxy-8-iodo-carbazole-3.6-disulphonic acid*

100 parts of 1-hydroxy-8-amino-carbazole-3.6-disulphonic acid are suspended in 100 parts of water and made Congo-acid by the addition of about 100 parts of diluted sulphonic acid or hydrochloric acid. At a temperature of 60–70° C. a solution of 10% sodium nitrite is dropped in until the diazotation is completed. The diazo compound separates during the operation in the form of solid needles. The separation is completed by salting out the cooled diazo solution. The isolated diazo-compound is suspended in about 500 parts of water and after the addition of 60 parts of potassium iodide it is decomposed as quickly as possible by means of copper powder at the temperature of 85–90° C. Dissolution of the suspended compound takes place, nitrogen being developed; from the filtered hot solution than a small quantity of hydroxy-carbazole-sulphonic acid crystallizes out in white needles. These are filtered off after cooling and the solution, freed from copper, is then carefully concentrated in vacuo. The acid is precipitated in the form of weakly grey flakes by the addition of alcohol. For further purifying, the acid is redissolved from diluted alcohol.

The following compounds are obtained in an analogous manner: 2-hydroxy-8-iodo-carbazole-3.6-disulphonic acid, 3-hydroxy-1-iodo-carbazole-6.8-disulphonic acid, 2-hydroxy-8-iodo-carbazole-3.7-disulphonic acid, and 1-hydroxy-3.6-diiodo-carbazole-8-sulphonic acid.

*Example 6.—1.1'-dicarbazole-disulphide-3.3'-6.6'-8.8'-hexasulphonic acid*

100 parts of 1-amino-carbazole-3.6.8-trisulphonic acid (acid potassium salt) are diazotized and isolated; the separated diazo compound is suspended with 1000 parts of water and poured into a solution of 40 parts of freshly prepared potassium xanthogenate in 350 parts of water. After well stirring for about 30–40 minutes a trifle of impurity is filtered off and the solution salted out with sodium chloride. The diazo-xanthogenic acid ester is suspended with about 700 parts of water and heated to a temperature of 70–75° C., while stirring; at a temperature of about 30° C. the development of nitrogen begins. After the reaction is complete, 75 parts of potassium hydroxide are added thereto and heated on the steam-bath for some hours. The reddish-violet solution is filtered from a trifle of black decomposition products and evaporated on the water bath to about 750 parts by volume. By acidifying with glacial acetic acid and adding sodium chloride the disulphide-dicarbazole-hexasulphonic acid separates on cooling. It crystallizes from water in the form of yellow, broad long needles.

*Example 7.—1-mercapto-carbazole-3.6.8-trisulphonic acid*

100 parts of 1.1'-dicarbazole-disulphide-3.3'-6.6'-8.8'-hexasulphonic acid (prepared according to Example 6) are dissolved in 1200 parts of water and boiled on a reflux condenser for two hours after the addition of 150 parts of 25% sulphuric acid and 50 parts of zinc dust. After filtering with suction and cooling, the new compound is salted out from the nearly colorless filtrate by means of sodium chloride. The zinc salt of the 1-mercapto-carbazole-3.6.8-trisulphonic acid is separated as a thick crystal paste. The zinc salt is obtained in the form of long white needles by recrystallizing it from water.

In an analogous manner, the following compounds are obtained in the form of their zinc salts: 2-mercapto-carbazole-3.6.8-trisulphonic acid, 3-mercapto-carbazole-1.6.8-trisulphonic acid, 2-mercapto-carbazole-6.8-disulphonic acid, 1-mercapto-carbazole-3-sulphonic acid, and 1-mercapto-carbazole-6-sulphonic acid.

*Example 8.—1-chloro-carbazole-3.6.8-trisulphonic acid*

100 parts of 1-amino-carbazole-3.6.8-trisulphonic acid (acid sodium salt) are dissolved in 2000 parts of hot water after the addition of 200 parts of diluted hydrochloric acid and diazotized with 126 parts by volume of a 10% solution of sodium nitrite while cooling with ice. The diazo compound separated according to Example 1 is suspended, while being still moist, with about 500 parts by volume of diluted hydrochloric acid and at a temperature of about 30° C. brought into a solution of cuprous chloride which is prepared from 50 parts of crystallized copper sulphate, 50 parts of sodium chloride and 200 parts by volume of diluted hydrochloric acid. Finally the mixture is heated until no more nitrogen develops to a temperature of about 60–70° C. The new acid separates as a white thick paste; it is redissolved by the addition of a small amount of water. After precipitation of the copper by means of hydrogen sulphide, the solution of the acid is concentrated on the water bath until crystallization begins. The 1-chloro-carbazole-3.6.8-trisulphonic acid crystallizes after cooling in form of fine fibrous needles arranged in form of sheaves; the acid is recrystallized from alcohol of 40% strength. The following compounds are obtained in an analogous manner: 1-chloro-carbazole-2.6.8-trisulphonic acid, 1-chloro-carbazole-4.6.8-trisulphonic acid, 1-chloro-carbazole-3.6-disulphonic acid, 1-chloro-carbazole-3-sulphonic acid, 1-chloro-carbazole-6-sulphonic acid, 2-hydroxy-8-chloro-carbazole-3.6-disulphonic acid, 3-hydroxy-1-chloro-carbazole-6.8-disulphonic acid, 2-hydroxy-8-chloro-carbazole-3.7-disulphonic acid, and 1-hydroxy-3.6-dichloro-carbazole-8-sulphonic acid.

*Example 9.—2-chloro-carbazole-trisulphonic acid*

The diazo compound which is obtained and separated in a manner analogous to Example 2, is suspended in 500 parts by volume of diluted hydrochloric acid and added at room temperature to a solution of 50 parts of cuprous chloride, dissolved in 250 parts by volume of a concentrated hydrochloric acid. A thick red-brown colored precipitate results which is dissolved especially on heating to a temperature of about 40–50° C., nitrogen being developed; after cooling the acid crystallizes out from the clear, weakly olive colored solution in form of long hair-like needles. This solution is diluted with water to about 600 parts by volume and freed from copper by means of hydrogen sulphide. After concentrating to about one third of the volume, the new acid crystallizes out from the filtrate in the form of long colorless needles. It has probably the constitution of a 2-chloro-carbazole-3.6.8-trisulphonic acid. The following compounds are obtained in an analogous manner: 2-chloro-carbazole-1.6.8-trisulphonic acid, 2-chloro-carbazole-1.4.8-trisulphonic acid, 2-chloro-carbazole-3.6-disulphonic acid, 2-chloro-carbazole-6-sulphonic acid, and 2-chloro-carbazole-3.6.8-trisulphonic acid.

*Example 10.—1 - bromo - carbazole - 3.6.8-trisulphonic acid*

The carbazole-3.6.8-trisulphonic acid-1-diazonium-bromide obtained from 1-amino-carbazole-3.6.8-trisulphonic acid in a manner analogous to Example 9, is decomposed and worked up in the same way with a solution of cuprous bromide. The new acid crystallizes in form of colorless needles. It separates from the aqueous solution by salting out in a gel-like form.

The following compounds are obtained in an analogous manner: 2-bromo-carbazole-1.6.8-trisulphonic acid, 3-bromo-carbazole-1.5.7-trisulphonic acid, 3 - bromo - carbazole - 2.3.8 - trisulphonic acid, 3-bromo-carbazole-2.5.7-trisulphonic acid, 3-bromo-carbazole-6.8-disulphonic acid, 3-bromo-carbazole-5.7-disulphonic acid, 3-bromo-carbazole-6-sulphonic acid, 3-bromo-carbazole-8-sulphonic acid, 2-hydroxy-8-bromo-carbazole-3.6-disulphonic acid, 3-hydroxy-1-bromo-carbazole-6.8-disulphonic acid, 2-hydroxy-8-bromo-carbazole-3.7-disulphonic acid, and 1-hydroxy-3.6-dibromo-carbazole-8-sulphonic acid.

*Example 11.—1-iodo-carbazole-3.6.8-trisulphonic acid*

100 parts of 1-amino-carbazole-3.6.8-trisulphonic acid (acid potassium salt) are dissolved in 2000 parts of water and 100 parts by volume of a 25% sulphuric acid and diazotized according to Example 1. The diazo solution is poured into a solution of 90 parts of potassium iodide dissolved in 100 parts of diluted sulphuric acid and 50 parts of water, which is kept on the boiling water bath. After all nitrogen has developed the filtered solution is concentrated to a very small amount. The 1 - iodo - carbazole - 3.6.8 - trisulphonic acid is crystallized out in the form of solid yellowish-colored needles which are arranged in a star-like form. By recrystallizing from diluted alcohol, particularly in the presence of a small amount of bisulphite solution, the acid is obtained in form of colorless needles.

The following compounds are obtained in an analogous manner: 2.7-diiodo-carbazole-3.6-disulphonic acid, 3.6-diiodo-carbazole-1.8-disulphonic acid, 2.7-diiodo-carbazole-8-monosulphonic acid, and 3.6-diiodo-carbazole-1-monosulphonic acid.

*Example 12.—1-cyanogen-carbazole-3.6.8-trisulphonic acid*

100 parts of 1-amino-carbazole-3.6.8-trisulphonic acid (acid potassium salt) are diazotized as described in Example 1. The diazo solution is poured at a temperature of 60–70° C. into an aqueous solution of a potassium cupricyanide which is prepared by adding an aqueous solution of 28 parts of crystallized copper sulphate to an aqueous solution of 29 parts of 100% potassium cyanide and 16 parts of 23.3% of ammonia. The diazo compound decomposes immediately, nitrogen being developed. Finally it is boiled for 30 minutes and then allowed to cool; the filtered solution is salted out by means of sodium chloride. The 1-cyanogen-carbazole-3.6.8-trisulphonic acid separates in the form of a thick paste of brownish-colored crystals. By recrystallizing from water in the presence of a small amount of animal charcoal it is obtained in the form of weakly yellow colored, long broad needles.

The following compounds are obtained in an analogous manner and possess similar properties: 2-cyanogen-carbazole-1.6.8-trisulphonic acid, 2-cyanogen-carbazole-1.4.8 - trisulphonic acid, 2 - cyanogen-carbazole-3.6-disulphonic acid, 2-cyanogen-carbazole-6-sulphonic acid, 2-cyanogen-carbazole-3.6.8-trisulphonic acid, 1-cyanogen-8-hydroxy-carbazole-3.6-disulphonic acid, and 1-cyanogen - 8 - chloro - carbazole - 3.6-disulphonic acid.

*Example 13.—3-cyanogen-carbazole-1.6.8-trisulphonic acid*

According to Example 3, 100 parts of 3-amino-carbazole-1.6.8-trisulphonic acid are diazotized and transformed into the 3-cyanogen-carbazole-1.6.8-trisulphonic acid as described in Example 12. The acid is obtained in the form of yellow-colored, broad needles by recrystallizing from water in the presence of a small amount of animal charcoal.

The following compounds are obtained in an analogous manner: 3-cyanogen-carbazole-1.5.8-trisulphonic acid, 3-cyanogen-carbazole-1.5.7-trisulphonic acid, 3-cyanogen-carbazole-2.3.8-trisulphonic acid, 3-cyanogen-carbazole-2.5.7-trisulphonic acid, 3-cyanogen-carbazole-6.8-disulphonic acid, 3-cyanogen-carbazole-5.7-disulphonic acid, 3-cyanogen-carbazole-8-hydroxy-1.6-disulphonic acid, 3-cyanogen-carbazole-6-sulphonic acid, and 3-cyanogen-carbazole-8-sulphonic acid. When using instead of cuprous cyanide, cuprous thiocyanide in an analogous manner, the corresponding thiocyanides of carbazole-sulphonic acids are produced, for example, 1-thiocyanogen - carbazole-3.6.8-trisulphonic acid.

*Example 14.—1-hydrazino-carbazole-3.6.8-trisulphonic acid*

100 parts of 1-amino-carbazole-3.6.8-trisulphonic acid are dissolved in 2000 parts of boiling water and diazotized in the same manner as indicated in Example 1. The diazo compound separates by salting out with sodium chloride. It is then finely suspended in 400 parts by volume of concentrated hydrochloric acid. A solution of 200 parts of stannous chloride in 150 parts of concentrated hydrochloric acid, which is cooled to a temperature of 0° C., is added at a temperature of 0° C., while stirring. The diazo compound dissolves immediately. Within a short time the hydrazine begins to separate as a voluminous mass. After several hours the white crystal paste is sucked off. It is purified by dissolving in about 3000 parts of water of 50° C. and filtering. The nearly colorless filtrate is salted out with about 400 parts of sodium chloride. The 1 - hydrazino-carbazole-3.6.8-trisulphonic acid is crystallized from a very dilute solution of sodium chloride in form of small long colorless sticks.

The following compounds are obtained in an analogous manner: 1-hydrazino-carbazole-2.6.8-trisulphonic acid, 1-hydrazino-carbazole-4.6.8-trisulphonic acid, 1-hydrazino-carbazole-3.6-disulphonic acid, 1-hydrazino-carbazole-3-sulphonic acid, and 1-hydrazino-carbazole-6-sulphonic acid.

*Example 15.—2 - hydrazino - carbazole - trisulphonic acid*

100 parts of 2-amino-carbazole-trisulphonic acid are diazotized in a manner analogous to Example 9 and the diazonium chloride is separated.—The diazo compound is stirred with about 800 parts by volume of concentrated hydrochloric acid to a paste and dropped at a temperature of 0° C. into a solution of stannous chloride prepared from 200 parts of crystallized stannous chloride and 160 parts by volume of concentrated hydrochloric acid.

The diazo compound dissolves, and a thick white precipitate separates, after standing at room temperature for about one day. It is then sucked off and washed first with concentrated, then with diluted hydrochloric acid. Further purification is accomplished by dissolving in warm water and by the addition of sodium chloride. After cooling the new acid crystallizes out in colorless needles. In an analogous manner the following compounds are obtainable: 2-hydrazino-carbazole-3.6.8-trisulphonic acid, 2-hydrazino-carbazole-1.6.8-trisulphonic acid, 2-hydrazino-carbazole-1.4.8-trisulphonic acid, 2-hydrazino-carbazole-3.6-disulphonic acid, and 2-hydrazino-carbazole-6-sulphonic acid.

*Example 16.—Carbazole-3.6.8-trisulphonic acid-1-arsonic acid*

100 parts of 1-amino-carbazole-3.6.8-trisulphonic acid are diazotized as described in Example 8, and the diazo compound is separated by sodium chloride. It is stirred to form a paste with about 100 parts of water and neutralized with a 5 normal solution of potassium hydroxide at room temperature. The diazo compound is quickly dissolved. From this solution it crystallizes and solidifies in form of a dark red paste. At room temperature, the calculated quantity of a 5 normal solution of potassium arsenite is added thereto. Nitrogen develops immediately. The development of nitrogen being finished, the mixture is allowed to stand for about one day, and then it is filtered off from a small quantity of an acid crystallized in form of fine needles. The filtrate is carefully concentrated until crystallization begins. The arsonic acid is thus obtained in the form of a crystalline mass. It is purified by recrystillization from a small amount of water.

In an analogous manner, the following compounds are obtained: carbazole-3.6-disulphonic acid-1.8-diarsonic acid, carbazole-3.6-disulphonic acid-1-hydroxy-8-arsonic acid, carbazole-3.6-disulphonic acid-1-arsonic acid, and carbazole-3-sulphonic acid-6-arsonic acid.

*Example 17.—Carbazole-2.6.8-trisulphonic-1-stibinic acid*

100 parts of 1 - amino - carbazole - trisulphonic acid are dissolved in 2500 parts of water and 60 parts by volume of diluted hydrochloric acid, and diazotized by dropping in about 107 parts by volume of a 10% solution of sodium nitrite. A solution of 24 parts of antimony oxide, dissolved in 75 parts by volume of pure concentrated hydrochloric acid, is added to this diazo solution at a temperature of about 30° C. A thick precipitate results immediately, which is dissolved by the addition of a 20% caustic soda lye. The yellow solution begins to froth strongly, while developing nitrogen. It is then heated to a temperature of 60–70° C. and stirred for about a quarter of an hour. After 1 hour the brown remainder is sucked off and the filtrate is concentrated until the crystallization begins. The stibinic acid is separated as a weakly yellow-colored crystalline mass and further purified by redissolving it from a small amount of water.

In an analogous manner, the following compounds are obtained: carbazole-3.6-disulphonic-1.8-distibinic acid, carbazole-3.6-disulphonic-1-hydroxy-8-stibinic acid, carbazole - 3.6 - disulphonic-1-stibinic acid, and carbazole-3-sulphonic-6-stibinic acid.

We claim:

1. As new products, substitution products of carbazole sulphonic acids of the formula:

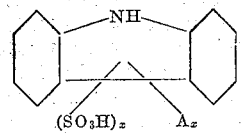
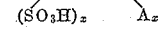

wherein A stands for an anion of the group consisting of the hydroxy, halo, cyano, thio-cyano, mercapto, disulphido, hydrazino, arsonic acid and stibinic acid group, at the most two of these anions being the same ones, and $x$ stands for one of the numbers 1, 2 and 3, the positions 1 and 8 being not both substituted by OH-groups simultaneously with the substitution of both the 3- and 6-positions by $SO_3H$-groups, said products being in the free state weakly colored crystals, dissolving readily in water, and being valuable intermediate products for the manufacture of dyestuffs and pharmaceutical products.

2. As new products, substitution products of carbazole sulphonic acids of the formula:

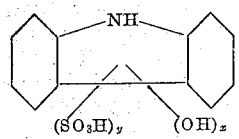

wherein $x$ stands for one of the numbers 1, 2 and $y$ stands for one of the numbers 1, 2 and 3, the positions 1 and 8 being not both substituted by OH-groups simultaneously with the substitution of both the 3- and 6-positions by $SO_3H$-groups, said products being in the free state weakly colored crystals, dissolving readily in water, and being valuable intermediate products for the manufacture of dyestuffs and pharmaceutical products.

3. As a new product, the compound of the formula:

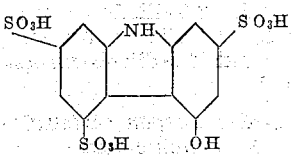

forming in the form of the sodium salt long, weakly brown colored needles dissolving readily in water.

4. As a new product, the compound of the formula:

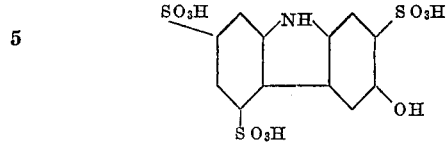

forming in the form of the sodium salt short, spindle-shaped needles dissolving readily in water.

5. As a new product, the compound of the formula:

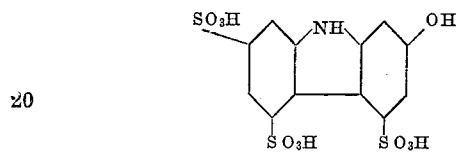

being in the free state weakly brown colored needles, dissolving readily in water, and being valuable intermediate products for the manufacture of dyestuffs and pharmaceutical products.

6. As new products the compounds of the formula:

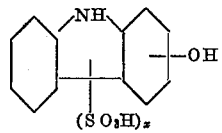

wherein $x$ stands for one of the numbers 1, 2 and 3, said products being in the free state weakly colored crystals, dissolving readily in water, and being valuable intermediate products for the manufacture of dyestuffs and pharmaceutical products.

7. As new products the compounds of the formula:

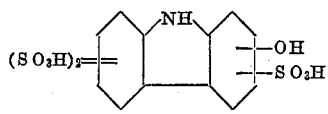

said products being in the free state weakly colored crystals, dissolving readily in water, and being valuable intermediate products for the manufacture of dyestuffs and pharmaceutical products.

FRIEDRICH MUTH.
ALBERT SCHMELZER.